(12) United States Patent
Casanave et al.

(10) Patent No.: US 8,100,994 B2
(45) Date of Patent: Jan. 24, 2012

(54) PROCESS FOR GENERATING ELECTRICITY AND HYDROGEN THAT COMPRISES A HYBRID REFORMER

(75) Inventors: Dominique Casanave, Stsymphorien D'Ozon (FR); Fabrice Giroudiere, Orlienas (FR); Nicolas Boudet, Chaponost (FR)

(73) Assignee: IFP Energies Nouvelles, Rueil Malmaison Cedex (FR)

( * ) Notice: Subject to any disclaimer, the term of this patent is extended or adjusted under 35 U.S.C. 154(b) by 835 days.

(21) Appl. No.: 12/174,740

(22) Filed: Jul. 17, 2008

(65) Prior Publication Data
US 2009/0035621 A1 Feb. 5, 2009

(30) Foreign Application Priority Data

Jul. 18, 2007 (FR) ...................................... 07 05248

(51) Int. Cl.
*C01B 3/36* (2006.01)
*C10J 3/46* (2006.01)

(52) U.S. Cl. ..................... 48/197 R; 48/198.1; 252/373; 423/650; 423/651; 423/652

(58) Field of Classification Search ................ 48/197 R, 48/198.1; 252/373; 423/650, 651, 652
See application file for complete search history.

(56) References Cited

U.S. PATENT DOCUMENTS

| 2004/0156778 A1* | 8/2004 | Hwang et al. ................. 423/651 |
| 2006/0111457 A1 | 5/2006 | Lee et al. |
| 2009/0158659 A1* | 6/2009 | Yamazaki et al. .............. 48/116 |
| 2009/0212259 A1* | 8/2009 | Noguchi et al. .............. 252/373 |
| 2011/0064631 A1* | 3/2011 | Rei et al. ....................... 422/627 |

FOREIGN PATENT DOCUMENTS

FR 2 857 003 A1 1/2005

OTHER PUBLICATIONS

F. Frusteri et al., "Steam and Auto-Thermal Reforming of Bio-Ethanol Over MgO and $CeO_2$ Ni Supported Catalysts", International Journal of Hydrogen Energy, vol. 31, No. 15 (2006) pp. 2193-2199.
V. Klouz et al., "Ethanol Reforming for Hydrogen Production in a Hybrid Electric Vehicle Process Optimisation", Journal of Power Sources, vol. 105, No. 1 (2002) pp. 26-34.
S. Ayabe et al., "Catalytic Autothermal Reforming of Methane and Propane Over Supported Metal Catalysts", Applied Catalysis A: General, vol. 241 (2003) pp. 261-269.

* cited by examiner

*Primary Examiner* — Timothy Vanoy
(74) *Attorney, Agent, or Firm* — Millen, White, Zelano & Branigan, P.C.

(57) ABSTRACT

The invention relates to a process for co-generating electricity and hydrogen that comprises a stage a for steam reforming in the presence of water and oxygen of a hydrocarbon feedstock in which the $O_2/C$ molar ratio is to be between 0.003 and 0.2, and the $H_2O/C$ molar ratio is to be between 2 and 5, followed by a stage b for the production of electricity in a fuel cell that uses the hydrogen-rich gas that is obtained from stage a as a power source.

19 Claims, No Drawings

PROCESS FOR GENERATING ELECTRICITY AND HYDROGEN THAT COMPRISES A HYBRID REFORMER

FIELD OF THE INVENTION

The invention is located in the field of processes for co-production of electricity and hydrogen.

Fuel cells have become more in demand in the electricity production field because they provide a response to non-polluting energy production: the electricity production is carried out by oxidation on an electrode of a reducing fuel, for example hydrogen, coupled to the reduction on the other electrode of an oxidizer, for example the oxygen of the air. The only discharge from the fuel cell is a stream of water. The PEM-type cells (Proton Exchange Membrane) are currently the most common, but there are other types of cells that can also be used in the process according to the invention.

The supply of the fuel cell with hydrogen is most often carried out by the use of a reformed fuel. The coupling of a reformer to the fuel cell makes it possible to prevent problems of shipping and storage of hydrogen. A reformer generates a hydrogen-rich gas from a feedstock such as hydrocarbon, alcohol, LPG (liquefied petroleum gas) and steam, optionally supplemented with an oxygen source.

Various processes are used for the production of a gas that comprises hydrogen:

Partial oxidation (POX for Partial Oxidation) is an exothermic reaction that is very often catalyzed and that produces hydrogen ($H_2$) by reaction between the feedstock and the oxygen ($O_2$) that is contained, for example, in air:

With methane, for example:

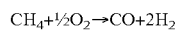
$$CH_4 + \tfrac{1}{2}O_2 \rightarrow CO + 2H_2$$

This reaction should be differentiated from total oxidation (TOX for Total Oxidation), which does not produce hydrogen ($H_2$):

With methane, for example:

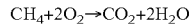
$$CH_4 + 2O_2 \rightarrow CO_2 + 2H_2O$$

The steam reforming (SMR for Steam Reforming) is an endothermic, also catalytic, reaction that produces hydrogen by reaction of the feedstock with steam ($H_2O$):

With methane, for example:

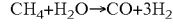
$$CH_4 + H_2O \rightarrow CO + 3H_2$$

The autothermal reforming (ATR for Autothermal Reforming) is the coupling of the partial oxidation reaction and steam reforming.

Whereby the exothermicity of the partial oxidation compensates for the endothermicity of the steam reforming, an autothermal reformer may be adiabatic, aside from heat losses. This operating mode is therefore important for the control of energy.

Steam reforming or autothermal reforming are preferred within the scope of the invention, because they lead to a synthesis gas (mixture of carbon monoxide (CO), carbon dioxide ($CO_2$), and hydrogen ($H_2$)) that is richer in hydrogen than the partial oxidation.

The selection of the reforming mode can be very important for the user because it has consequences on the reactor and on the reformate.

During steam reforming, the reforming zone is supplied only by a mixture of feedstock and steam. Under these conditions, the coking phenomenon cannot be avoided. The word "coke" refers to carbon-rich solid materials or to precursors of said materials that can be produced during the cracking of hydrocarbons. The deposition of coke on the reforming catalyst brings about a reduction—and even a termination—of the activity of the catalyst. The service life of the catalyst is considerably limited by this coking phenomenon, which is well known in the art.

The autothermal reforming makes it possible to avoid this drawback: the introduction of oxygen into the mixture makes it possible to prevent the formation of coke. However, the amount of oxygen that is necessary to provide an adiabatic behavior of the reformer (behavior of an ATR) is relatively large. As a result, the hydrogen-rich gas product is diluted by the nitrogen of the air. Furthermore, the solution that consists in using pure oxygen is relatively expensive.

In the following text, the $O_2/C$ ratio designates the ratio of the number of moles of oxygen in the $O_2$ molecular form to the number of moles of carbon C present in the feedstock.

The $H_2O/C$ ratio designates the ratio of the number of moles of water in the $H_2O$ molecular form to the number of moles of carbon C present in the feedstock.

BACKGROUND OF THE INVENTION

Patent applications US 2004/0136901 and WO 2007/002599 relate to the general technological background.

Application US 2004/0136901 describes the reforming of a feedstock that can be carried out according to the three methods described above. For an autothermal reforming, the feedstock is mixed with a gas that contains oxygen (which can be pure oxygen, oxygen-enriched air, or air) in an $O_2/C$ ratio of typically between 0.3 and 0.8, and with steam according to an $H_2O/C$ ratio of typically between 0.1 and 3.0.

According to application WO 2007/002599, the steam reforming of a light feedstock such as methanol, ethanol, methane, ethane, propane, etc., is typically carried out with an $H_2O/C$ ratio of between 2 and 4. For heavier feedstocks, such as gasoline or diesel, this ratio can, in exceptional cases, reach 10.

Among documents in the prior art, patent application US 2006/0133992 describes a process for autothermal reforming of certain hydrocarbons that produce the hydrogen that is used for a fuel cell.

There are also patent documents that relate to reforming catalysts that specify ranges of operating conditions for the use of these catalysts:

Patent application US 2006/0111457 describes an autothermal reforming catalyst that is based on cerium oxide, and zirconium oxide and platinum oxide, and that operates with an $O_2/C$ ratio of between 0.1 and 0.8 and the $H_2O/C$ ratio of between 1 and 3.

Likewise, patent application US 2003/0060363 describes an autothermal reforming catalyst that is based on ruthenium, cerium oxide, and aluminum oxide and that operates with an $O_2/C$ ratio of between 0.1 and 0.5, preferably between 0.2 and 0.4, and the $H_2O/C$ ratio of between 0.1 and 5, and preferably between 0.5 and 3.0.

U.S. Pat. No. 6,749,828 describes an autothermal reforming catalyst that is based on ruthenium and zirconium and that operates with an $O_2/C$ ratio of between 0.1 and 1, preferably between 0.2 and 0.8, and the $H_2O/C$ ratio of between 0.1 and 10, preferably between 0.4 and 4.

Patent application US 2006/0093550 describes a very particular reforming catalyst that comprises nickel, cobalt, cerium, magnesium, and yttrium and that operates with an $O_2/C$ ratio of between 0.01 and 0.6, preferably between 0.4 and 0.6, and the $H_2O/C$ ratio of between 0 and 10, preferably between 0 and 2.

In contrast, patent application US 2004/0156778 describes a method for producing hydrogen-rich gas from hydrocarbon. In this method, hydrocarbon is brought into contact with air, water and a partial oxidation catalyst (POX). The entering flows have to comply with an $O_2/C$ ratio of between 0.02 and 0.15 and an $H_2O/C$ ratio of between 1 and 5.

SUMMARY DESCRIPTION OF THE INVENTION

The present invention is a process for co-generating electricity and hydrogen that comprises a steam-reforming stage a in the presence of water and oxygen of a hydrocarbon feedstock and a stage b for producing electricity in a fuel cell that uses the hydrogen-rich gas that is obtained from stage (a) as a power source.

The process according to the invention makes it possible in particular to maximize the electrical output of the fuel cell that is supplied by a reformer. In particular, the invention specifies the operational mode of the reformer during stage (a) so as to obtain a high yield with the fuel cell that is used during stage (b).

In the steam-reforming reactor according to stage (a), the amount of air that is introduced is small. The introduction of this air does not have the object of an adiabatic operation of the reactor as in an autothermal reformer. On the contrary, the air flow rate should be reduced to prevent the dilution of hydrogen-rich gas, while being enough to prevent the coking of the catalyst. Thus, to reach the set objective, i.e., to combine the advantage of the steam reforming, which is to produce a flow in which the hydrogen mole fraction is large, with the advantage of the autothermal reforming, which is to prevent the coking of the catalyst, the streams of steam and air are introduced in the following proportions: the $O_2/C$ ratio is to be between 0.003 and 0.2, and the $H_2O/C$ ratio is to be between 2 and 5.

The hydrogen-rich gas that is produced is consumed in stage b by a fuel cell that generates electricity and, secondarily, heat.

DETAILED DESCRIPTION OF THE INVENTION

In the description below, the terms reforming or steam-reforming are used interchangeably.

The installation that corresponds to the process according to the invention comprises at least one hybrid steam-reforming reactor in the presence of air and a fuel cell. Preferably, this installation also comprises a section for purification of the reformed gas downstream from the reformer and upstream from the fuel cell, a burner, and a heat exchange system.

The hybrid reformer that is used during stage (a) is a reforming reactor that contains a catalyst. This reforming catalyst generally contains nickel, ruthenium, rhodium, palladium or platinum. In some devices, the platinum, palladium or rhodium, or a mixture of the latter is put on a porous oxide substrate. For example, the patent application FR2857003 describes suitable catalysts. Any type of reforming catalyst may be used in the process according to the invention.

The reactor has one or more intake hoses for the feedstock, air and steam, and an exhaust hose for the hydrogen-rich effluent gas.

The hydrocarbon feedstocks that are to be reformed are preferably selected from among desulfurized hydrocarbons without aromatic compounds, containing very few olefins and that may be likely to form coke (carbon-containing chains with 2 or more carbon atoms). The primary feedstocks are methanol, ethanol, ethane, propane, butane, naphtha (all of the alkanes, in general), LPG, natural gas, gasoline, kerosene, gas oil, as well as glycerin, or alcohols that are heavier than ethanol, or mixtures thereof. Very preferably, the feedstock that is used is ethanol, because it makes it possible to produce the hydrogen itself by limiting the carbon dioxide ($CO_2$) wastes. The objective is preferably to produce a "bio hydrogen," i.e., a hydrogen that is obtained from the biomass; thus glycerin and ethanol can be considered in particular for producing "bio hydrogen." However, any type of feedstock can be considered. When the latter contains sulfur-containing compounds, a desulfurization unit is preferably installed upstream from the reformer.

For economic reasons, air is preferably introduced into the reforming reactor as an oxygen source; it is also possible, however, to introduce oxygen-enriched air or pure oxygen.

The streams of steam and air are introduced in the following proportions: the $O_2/C$ ratio is between 0.003 and 0.2, and the $H_2O/C$ ratio is between 2 and 5. Preferably, the $O_2/C$ ratio is to be between 0.003 and 0.15, preferably between 0.003 and 0.045, more preferably between 0.003 to 0.040, even more preferably between 0.005 and 0.030, or even between 0.005 and 0.025. Preferably, the $H_2O/C$ ratio is between 2.3 and 4.5, more preferably between 2.4 and 4.0, and even between 2.5 and 3.5.

The steam reforming according to the invention is generally carried out in a temperature range from 600° C. to 750° C., preferably between 650° C. and 725° C., at a pressure of 0.1 MPa to 2.0 MPa, preferably 0.2 to 1.0 MPa, more preferably from 0.3 to 0.5 MPa. The yield of the cell in PCI (net calorific power) of the cell is between 60% and 100%.

At the outlet of the reforming reactor, the hydrogen-rich effluent gas contains many impurities, in particular carbon monoxide (CO), whose volumetric percentage is generally between 5 and 15%. The latter is particularly troublesome, because in general beyond 100 ppm, it poisons the catalyst of the fuel cells. For this reason, a unit for separation and purification can be installed to extract the pure hydrogen.

It is known that the carbon monoxide level can be reduced by using the reaction for conversion of carbon monoxide with water (WGS for Water Gas Shift).

$$CO + H_2O \rightarrow CO_2 + H_2 \quad \text{(WGS)}$$

In this reaction, the steam that is used can be that which is present in excess in the effluent or else in the steam that is added to the reformate. It requires the use of a suitable catalyst. It can have one or more catalytic zones there, combined or separated, at the same temperature or at different temperatures. It is common, for example, for one skilled in the art to use two separate catalytic zones, one at a high temperature (from 300 to 560° C.) upstream (High-Temperature Conversion or HT Shift), and one at low temperature (from 200 to 260° C.) downstream (Low-Temperature Conversion or LT Shift). At the outlet of a reactor for converting carbon monoxide with water, the volumetric percentage of carbon monoxide (CO) is generally from about 0.5 or more. The effluent also contains $H_2O$ and carbon dioxide ($CO_2$). According to the degree of purity that the user desires to obtain, it is suitable to use an additional purification means.

It is possible to use an additional reactor to carry out a preferred oxidation reaction (PrOX for Preferred Oxidation).

$$CO + \tfrac{1}{2}O_2 \rightarrow CO_2 \quad \text{(PrOx)}$$

This catalytic reaction is conducted at a temperature that promotes the oxidation of carbon monoxide with the oxygen of the air in the presence of hydrogen but without consuming or oxidizing substantial amounts of hydrogen, or conducting the inverse reaction of the conversion of carbon monoxide with steam (RWGS for Reverse Water Gas Shift).

It can also be considered to use—in place of or as an addition to the means already proposed—a system for purification by adsorption (PSA for Pressure Swing Adsorption). This technology makes it possible to obtain hydrogen of very high purity (more than 99.9% by volume) from a reformate after conversion of the carbon monoxide. The PSA is based on the adsorption principle of impurities on molecular sieve beds. Regeneration is achieved by pressure relief of the adsorption bed and flushing by an internal purging gas. The continuity of the system is ensured by the installation in parallel of several tanks. A membrane purification is also a system that is frequently used.

The hydrogen-rich gas that is obtained from the reformer is completely or partially introduced during stage (b) into a fuel cell for the purpose of producing electricity.

There are several types of fuel cells, including some that can be supplied by a reformed gas: the fuel cells with a proton exchanger membrane (PEMFC or PEM according to English terminology), fuel cell with phosphoric acid (PAFC according to English terminology), the fuel cells with solid oxides (SOFC according to English terminology). All of these types of cells can be used in the process according to the invention.

The PAFC cells use phosphoric acid as an electrolyte. Their electrodes consist of platinum-coated carbon and are therefore expensive to produce. The PAFC cells are usually intended for applications at continuous and stable speed. Actually, the phosphoric acid solidifying at 40° C., the start-up of these cells is difficult. Moreover, they have a combined energy yield that is close to 80% because the heat that is produced by the cell operating between 150° C. and 200° C. can be exploited.

In the SOFC cells, the oxygen ions are moved through a solid oxide that is taken as a high-temperature electrolyte so as to react with the hydrogen of the anode side. They operate at a very high temperature, typically between 70 and 1000° C. As a result, there is no need for expensive catalysts. They are provided essentially for the powerful stationary applications. The total yield may reach 70% if the gaseous effluents are used to produce electricity via gas turbines.

However, preferably, the cell that is used during stage b of the process is of PEM type. Also called a fuel cell with a polymeric electrolyte membrane, it uses a membrane that conducts the hydrogen ions but not the electrons. For example, the PEM-type cell is equipped with a Nafion® membrane that is an entirely fluorinated ion exchange resin, formed by a vertebral column that contains only $CF_n$ groups on which groups of sulfonic acid are connected. The electrodes are covered by a catalyst such as platinum, which makes the cell quite expensive. The catalyst is easily poisoned by carbon monoxide (CO). However, its major asset is its compactness, which allows it to be installed in moving applications.

To maximize the electrical output of the entire process, it is necessary that the hydrogen production system have a good output, but also that the quality of the delivered hydrogen allows the cell to maximize its electrical production. The electrical output of a PEM cell is generally 23% to 50%. The dilution of hydrogen generally has a negative effect on the electrical output of the cell: for the same amount of hydrogen, the more the latter is diluted, the lower the electrical production of the cell, because the rate of use of the hydrogen in the cell is low. The electrical performance levels of the cell can be modeled as a function of the hydrogen mole fraction in the stream that feeds the cell.

Consequently, in the process according to the invention, it is a fuel whose hydrogen ($H_2$) mole fraction is between 50% and 100%, and even preferably 65% and 100%, which is used in stage b.

The gases that exit from the anode and the cathode of the cell can be recycled. At the level of the anode, the exiting gas comprises the gas that is reformed during stage (a) and is low in hydrogen during stage (b). At the level of the cathode, the exiting gas comprises air and water. The recycling of these gases can consist in burning the remainder of the hydrogen and the carbon monoxide (CO) that are present in the anodic gases with the remainder of the oxygen that is present in the cathodic air, and, optionally, with a make-up fuel. The hot effluents that are obtained from the burner can make it possible to heat or to evaporate the feedstocks that enter into the steam-reforming reactor, but also to heat the reactor itself because its endothermic operation requires an outside supply of energy.

The following examples illustrate the invention and compare it to the prior art.

EXAMPLES

Preparation of the Reforming Catalyst

According to the Patent Application FR2857003, According to Claim 2 as Follows Preparation of a Spinel-Type Substrate A γ-alumina substrate with a specific surface area of 130 $m^2/g$, in the form of balls with a mean grain size of 2 mm, is brought into contact with an aqueous solution that contains 87 μl of magnesium nitrate ($Mg(NO_3)_2$, $6H_2O$) and 256 g/l of aluminum nitrate ($Al(NO_3)_3$, $9H_2O$). The alumina substrate is completely covered by the solution; the duration of the impregnation stage is 48 hours. The container is then placed in a sand bath at a temperature of 100° C., which makes it possible to evaporate excess solution in a controlled manner. After complete evaporation, the substrate is placed in an oven at 120° C. for 15 hours. Since the formation of aluminate requires high temperatures, the substrate is placed in a muffle furnace to undergo two successive heat treatments there: 2 hours at 400° C. (rate of rise=2° C./min), then 3 hours at 600° C. (rate of rise=1° C./min), dropping to 50° C. (10° C./min), rising up to 600° C. at 5° C./min, then 4 hours at 900° C. (rate of rise=2° C./min), and finally 15 hours at 1000° C. (rate of rise=1° C./min).

Deposition of the Active Phase

The deposition of the metal or metals of group VIII is then carried out by impregnation of an aqueous solution. 5.79 g of rhodium nitrate ($Rh(NO_3)_3$, $xH_2O$) is dissolved in a volume of 250 $cm^3$ of permuted water. The solution is brought into contact with the substrate for 48 hours while being stirred at ambient temperature. The catalyst is then placed in a sand bath at 100° C. to evaporate excess solution, dried for 15 hours at 120° C., and finally calcined for 5 hours in a flushed bed at 700° C. (rate of rise=2° C./min, air flow rate of 1 l/h/g of catalyst). The thus prepared catalyst contains 5% by weight of Mg in the form of $MgAl_2O_4$, and 0.2% by weight of rhodium (Rh). The dispersion of rhodium (Rh) that is measured by hydrogen chemisorption after reduction at 500° C. for 4 hours indicates dispersion (metal fraction in surface area) of 49%.

Example 1

Process According to the Prior Art for Generating Electricity and Hydrogen by Autothermal Reforming of Ethanol This process consists of an autothermal reformer that has a reforming catalyst that is prepared according to the method that is described above, a reactor for high-temperature conversion of carbon monoxide, a reactor for low-temperature conversion of carbon monoxide, a preferred oxidation reactor, a PEM-type fuel cell that is equipped with a Nafion® membrane, a burner, and heat exchangers between the hot effluents of the burner and the hydrocarbon feedstock (ethanol), water, and the air entering into the autothermal reforming reactor.

The operating conditions are described in Table 1.

Example 2

Process According to the Invention with Steam Reforming of Ethanol in the Presence of Air This process consists of a steam-reforming reformer that has a reforming catalyst that is prepared according to the method that is described above, a reactor for high-temperature conversion of carbon monoxide, a reactor for low-temperature conversion of carbon monoxide, a preferred oxidation reactor, a PEM-type fuel cell that is equipped with a Nafion® membrane, a burner whose hot effluents heat the steam reformer then heat and/or evaporate the hydrocarbon feedstock (ethanol) and the steam that enters into the steam reformer.

The operating conditions are described in Table 1.

TABLE 1

|  | Example 1 | Example 2 |
|---|---|---|
| PARAMETERS: |  |  |
| Reactor Inlet Temperature (ATR/Reforming) (° C.) | 450 | 550 |
| Reactor Exit Temperature (ATR/Reforming) (° C.) | 725 | 725 |
| Pressure (ATR/Reforming) MPa abs. | 0.3 | 0.3 |
| $O_2/C$ Molar Ratio in Terms of Feed | 0.35 | 0.01 |
| $H_2O/C$ Molar Ratio in Terms of Feed | 2 | 2.5 |
| RESULTS: |  |  |
| Reactor Exit Composition (% by Volume): |  |  |
| $H_2$ | 31.24 | 46.81 |
| CO | 7.64 | 10.64 |
| $CO_2$ | 9.41 | 8.85 |
| $H_2O$ | 28.87 | 32.34 |
| $N_2$ | 22.56 | 0.75 |
| $CH_4$ | 0.28 | 0.61 |
| PEM Cell Input Composition (% by Volume): |  |  |
| $H_2$ | 44.03 | 68.12 |
| CO | 10 to 100 ppm | 10 to 100 ppm |
| $CO_2$ | 19.57 | 23.40 |
| $H_2O$ | 9.09 | 5.18 |
| $N_2$ | 26.99 | 2.54 |
| $CH_4$ | 0.32 | 0.72 |
| $H_2$ in the Feed Gas of the Cell (% by Volume) | 44 | 68.12 |
| $\lambda_{H2}^{(1)}$ | 1.98 | 1.4 |
| $H_2$ Production Yield (%)$^{(2)}$ | 86.4 | 99.5 |
| Yield of the Cell (%)$^{(3)}$ | 23.2 | 32.9 |
| Gross Yield of the Process (%)$^{(4)}$ | 20.1 | 32.7 |
| Parasitic Consumption (%)$^{(5)}$ | 4.15 | 3.4 |
| Net Yield of the Process (%)$^{(6)}$ | 16 | 29 |

Definitions:

$^{(1)}$The stoichiometry of the hydrogen in the PEM cell: $\lambda_{H2}$ = inverse of the converted hydrogen fraction in the cell $^{(2)}$The yield of the hydrogen production, calculated from the hydrogen flow rate feeding the cell =

$$\frac{PCI_{H2} * \text{Flow Rate}_{H2}}{PCI_{ethanol} * \text{Flow Rate}_{ethanol\ consumed\ by\ process}} \quad (PCI = \text{net calorific power})$$

$^{(3)}$The yield of the PEM cell: ratio between the electric power that is delivered in alternating current form and the thermal power of hydrogen feeding the cell.

$^{(4)}$The gross yield of the process: ratio between the electric power that is delivered in alternating current form and the thermal output of the consumed ethanol $^{(5)}$The electrical parasitic consumption: ratio between the electric power that the system itself consumes (fans, pumps) and the thermal power of hydrogen feeding the cell.

$^{(6)}$The net yield of the process: ratio between the electric power that is delivered in alternating current form to the power that is removed by parasitic consumption, and the thermal power of consumed ethanol.

The performance levels of the cell are estimated from the results that are published in *Fuel Cell Handbook*, 6$^{th}$ Edition, U.S. Department of Energy. Morgantown, W.V., November 2002, and are presented in Table 1.

The comparison of Example 2 according to the invention with Example 1 of a standard process with autothermal reforming shows the technical advantage of the invention. Thanks to a higher concentration of hydrogen in the stream feeding the cell, the performance levels of the fuel cell are improved, which makes it possible for the process to have a better net yield.

Example 3

Process According to the Prior Art of Electricity and Hydrogen Generation by Authothermal Reforming of Methanol This process is the same as that of Example 1. The feedstock that is introduced consists of 100% methanol.

The operating conditions are described in Table 2.

Example 4

Process According to the Invention with Steam Reforming of Methanol in the Presence of Air This process is the same as that of Example 2. The feedstock that is introduced consists of 100% methanol.

The operating conditions are described in Table 2.

TABLE 2

| | Example 3 | Example 4 |
|---|---|---|
| PARAMETERS: | | |
| Reactor Inlet Temperature (ATR/Reforming) (° C.) | 450 | 550 |
| Reactor Exit Temperature (ATR/Reforming) (° C.) | 750 | 750 |
| Pressure (ATR/Reforming) MPa abs. | 0.3 | 0.3 |
| $O_2$/C Molar Ratio in Terms of Feed | 0.58 | 0.01 |
| $H_2O$/C Molar Ratio in Terms of Feed | 3 | 3.5 |
| RESULTS: | | |
| Reactor Exit Composition (% by Volume): | | |
| $H_2$ | 29.25 | 52.09 |
| CO | 5.27 | 8.79 |
| $CO_2$ | 6.90 | 6.51 |
| $H_2O$ | 31.84 | 32.04 |
| $N_2$ | 26.67 | 0.57 |
| $CH_4$ | 0.07 | 0.00 |
| PEM Cell Input Composition (% by Volume): | | |
| $H_2$ | 42.29 | 74.25 |
| CO | 10 to 100 ppm | 10 to 100 ppm |
| $CO_2$ | 15.02 | 18.81 |
| $H_2O$ | 9.09 | 5.09 |
| $N_2$ | 33.51 | 1.85 |
| $CH_4$ | 0.09 | 0.00 |
| $H_2$ in the Feed Gas of the Cell (% by Volume) | 42.29 | 74.25 |
| $\lambda_{H2}$[1] | 2.03 | 1.31 |
| $H_2$ Production Yield (%)[2] | 84.28 | 96.34 |
| Yield of the Cell (%)[3] | 22.5 | 34.82 |
| Gross Yield of the Process (%)[4] | 18.96 | 33.56 |
| Parasitic Consumption (%)[5] | 3.5 | 2.3 |
| Net Yield of the Process (%)[6] | 16 | 31.33 |

[1] to [6] See definitions under Table 1.

Table 2 makes it possible to compare the performance levels of Example 4, according to the invention, relative to the standard autothermal reforming of Example 3, in the case, each time, of a feedstock that consists of 100% methanol.

The entire disclosures of all applications, patents and publications, cited herein and of corresponding French application Ser. No. 07/05.248, filed Jul. 18, 2007 are incorporated by reference herein.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A process for co-generating electricity and hydrogen that comprises:
   a stage (a) for steam reforming in the presence of steam and oxygen of a hydrocarbon feedstock in which the $O_2$/C molar ratio is to be between 0.01 and 0.1, and the $H_2O$/C molar ratio is to be between 2.5 and 3.5;
   a stage (b) for the production of electricity in a fuel cell that uses the hydrogen-rich gas that is obtained from stage (a) as a power source.

2. A co-generation process according to claim 1, in which the $O_2$/C molar ratio is between 0.003 to 0.045.

3. A co-generation process according to claim 2, in which the fuel that exits from the reformer in stage (a) and that feeds the cell in stage (b) has a hydrogen mole fraction of between 50% and 100%.

4. A co-generation process according to claim 2, in which the oxygen source that is introduced during stage (a) is air.

5. A co-generation process according to claim 2, in which the hydrocarbon feedstock introduced during stage (a) is selected from the group consisting of: methanol, ethanol, alkanes, ethane, propane, butane, naphtha, LPG, natural gas, gasoline, kerosene, gas oil, glycerin, heavier alcohols than ethanol, and mixtures thereof.

6. A co-generation process according to claim 2, in which the feedstock to stage (a) is ethanol.

7. A co-generation process according to claim 2, in which the fuel cell is of the PEM type.

8. A co-generation process according to claim 2, in which the steam reforming stage (a) is carried out in a temperature range from 600° C. to 750° C. and at a pressure of 0.1 MPa to 2.0 MPa.

9. A co-generation process according to claim 2, in which the gases that exit from the fuel cell after stage (b) are recycled.

10. A co-generation process according to claim 1, in which the fuel that exits from the reformer in stage (a) and that feeds the cell in stage (b) has a hydrogen mole fraction of between 50% and 100%.

11. A co-generation process according to claim 1, in which the oxygen source that is introduced during stage (a) is air.

12. A co-generation process according to claim 1, in which the hydrocarbon feedstock introduced during stage (a) is selected from the group consisting of: methanol, ethanol, alkanes, ethane, propane, butane, naphtha, LPG, natural gas, gasoline, kerosene, gas oil, glycerin, heavier alcohols than ethanol, and mixtures thereof.

13. A co-generation process according to claim 1, in which the feedstock to stage (a) is ethanol.

14. A co-generation process according to claim 1, in which the fuel cell is of the PEM type.

15. A co-generation process according to claim 1, in which the steam reforming stage (a) is carried out in a temperature range from 600° C. to 750° C. and at a pressure of 0.1 MPa to 2.0 MPa.

16. A co-generation process according to claim 1, in which the gases that exit from the fuel cell after stage (b) are recycled.

17. A co-generation process according to claim 1, wherein the $O_2$/C molar ratio is between 0.003 and 0.040.

18. A co-generation process according to claim 1, wherein the $O_2$/C molar ratio is between 0.005 and 0.030.

19. A co-generation process according to claim 1, wherein the $O_2$/C molar ratio is between 0.005 and 0.025.

* * * * *

UNITED STATES PATENT AND TRADEMARK OFFICE
CERTIFICATE OF CORRECTION

| | | |
|---|---|---|
| PATENT NO. | : 8,100,994 B2 | Page 1 of 2 |
| APPLICATION NO. | : 12/174740 | |
| DATED | : January 24, 2012 | |
| INVENTOR(S) | : Dominique Casanave | |

It is certified that error appears in the above-identified patent and that said Letters Patent is hereby corrected as shown below:

In The Claims:

Column 10, line 8 reads: "3. A co-generation process according to claim 2, in which"
Should read: --3. A co-generation process according to claim 1, in which--.

Column 10, line 12 reads: "4. A co-generation process according to claim 2, in which"
Should read: --4. A co-generation process according to claim 1, in which--.

Column 10, line 14 reads: "5. A co-generation process according to claim 2, in which"
Should read: --5. A co-generation process according to claim 1, in which--.

Column 10, line 20 reads: "6. A co-generation process according to claim 2, in which"
Should read: --6. A co-generation process according to claim 1, in which--.

Column 10, line 22 reads: "7. A co-generation process according to claim 2, in which"
Should read: --7. A co-generation process according to claim 1, in which--.

Column 10, line 24 reads: "8. A co-generation process according to claim 2, in which"
Should read: --8. A co-generation process according to claim 1, in which--.

Column 10, line 28 reads: "9. A co-generation process according to claim 2, in which"
Should read: --9. A co-generation process according to claim 1, in which--.

Column 10, line 31 reads: "10. A co-generation process according to claim 1, in which"
Should read: --10. A co-generation process according to claim 2, in which--.

Column 10, line 35 reads: "11. A co-generation process according to claim 1, in which"
Should read: --11. A co-generation process according to claim 2, in which--.

Signed and Sealed this
Twentieth Day of March, 2012

David J. Kappos
*Director of the United States Patent and Trademark Office*

CERTIFICATE OF CORRECTION (continued)
U.S. Pat. No. 8,100,994 B2

In The Claims:

Column 10, line 37 reads: "12. A co-generation process according to claim 1, in which"
Should read: --12. A co-generation process according to claim 2, in which--.

Column 10, line 43 reads: "13. A co-generation process according to claim 1, in which"
Should read: --13. A co-generation process according to claim 2, in which--.

Column 10, line 45 reads: "14. A co-generation process according to claim 1, in which"
Should read: --14. A co-generation process according to claim 2, in which--.

Column 10, line 47 reads: "15. A co-generation process according to claim 1, in which"
Should read: --15. A co-generation process according to claim 2, in which--.

Column 10, line 51 reads: "16. A co-generation process according to claim 1, in which"
Should read: --16. A co-generation process according to claim 2, in which--.